Sept. 23, 1969   R. J. WARNEKE   3,468,037
TEACHING DEVICE
Filed Nov. 25, 1966   2 Sheets-Sheet 1
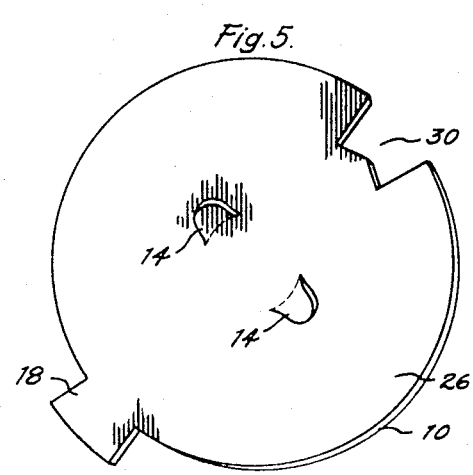
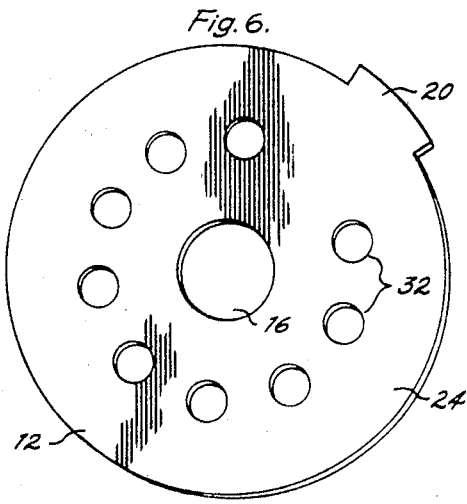
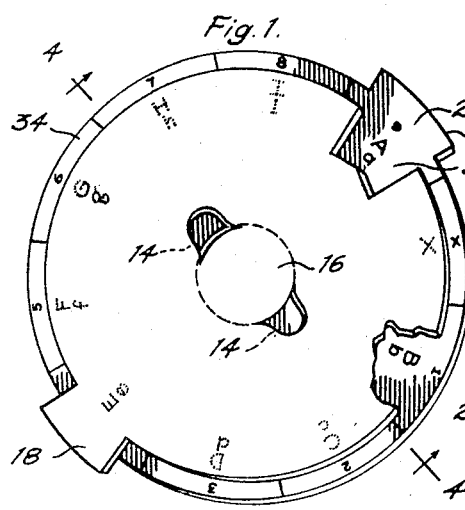
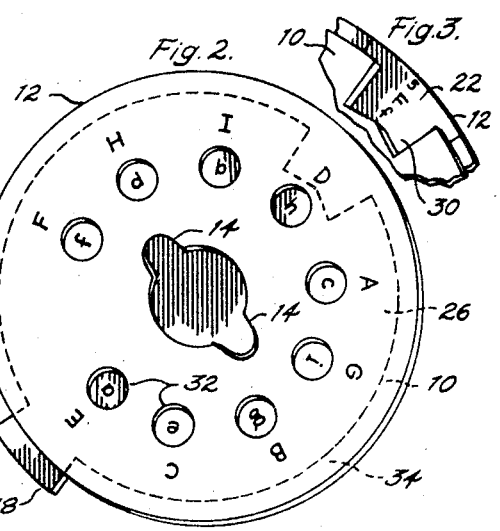
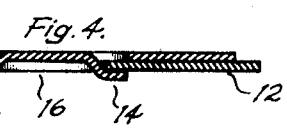
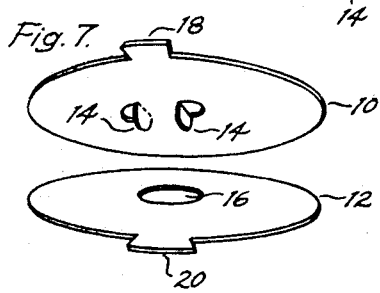
INVENTOR.
RICHARD J. WARNEKE Sept. 23, 1969    R. J. WARNEKE    3,468,037
TEACHING DEVICE
Filed Nov. 25, 1966    2 Sheets-Sheet 2
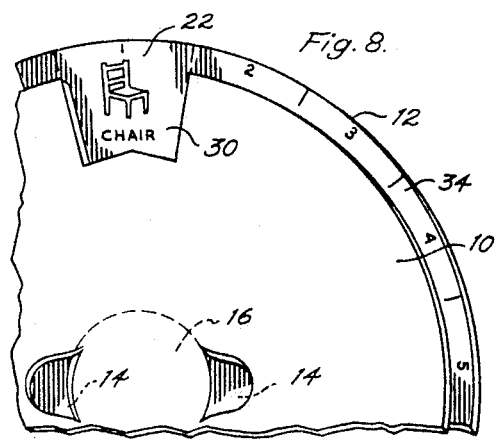
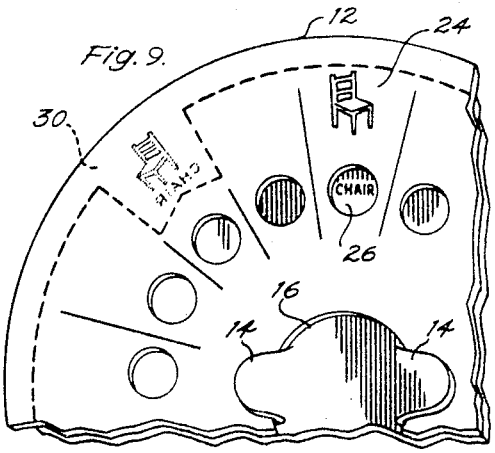
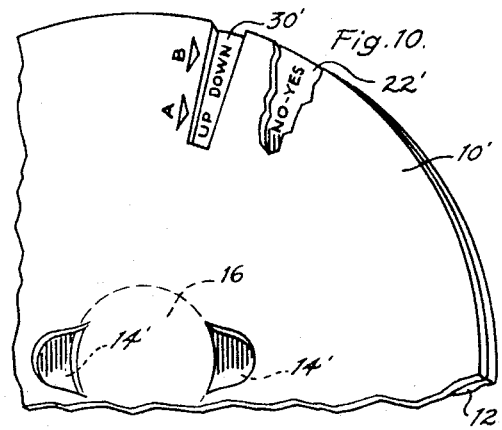
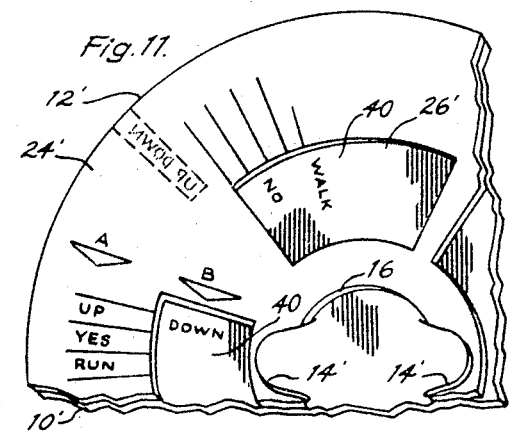
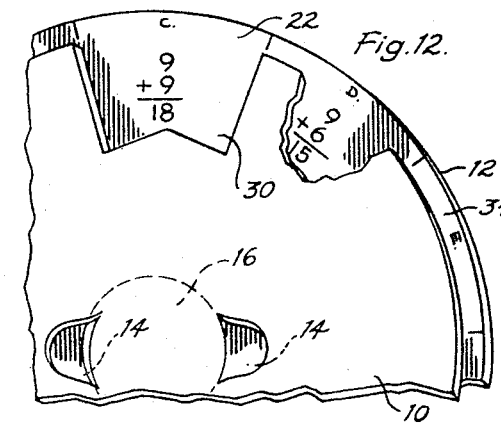
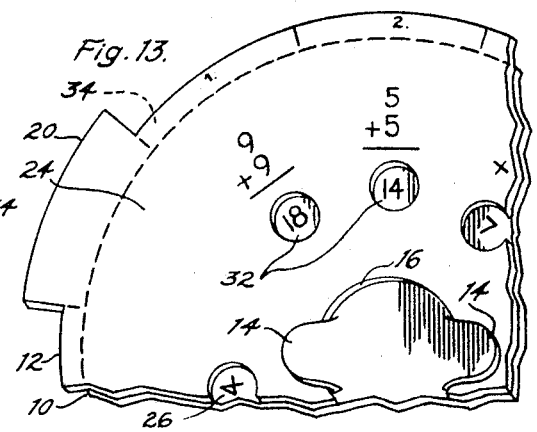
INVENTOR.
RICHARD J. WARNEKE
BY Wallenstein,
Spangenberg,
Hattis, & Strampel United States Patent Office 3,468,037
Patented Sept. 23, 1969

3,468,037
TEACHING DEVICE
Richard J. Warneke, 3824 Grand Ave.,
Western Springs, Ill. 60558
Filed Nov. 25, 1966, Ser. No. 597,047
Int. Cl. G09b 3/02, 19/00
U.S. Cl. 35—9                             11 Claims

ABSTRACT OF THE DISCLOSURE

A self-contained, hand manipulated teaching device which preferably is in the form of two concentrically oriented, rotatable discs. The discs have openings therein and informational material arranged thereon which, by proper rotation of the discs, provides a unique learning program format for the user.

---

The present invention relates to a teaching device and in particular to a self-contained, hand manipulated teaching device which comprises, among other things, a unique learning program format.

Programmed teaching devices have, for many years, been recognized as important educational tools. Devices of this type have taken various forms ranging from simple cards to complex electronic machines. Generally speaking, teaching devices, whether they be of simple or complex construction, have a learning program format which involves the steps of sequentially presenting material or increments of information to a student, eliciting a response from him, and reinforcing the response by providing the correct answer for comparison with the student's answer. So far as is known, such devices, heretofore, have been programmed to give only correct answer reinforcement. The student, therefore, is merely made aware that he did not give a correct response and no provision is made in the program format for reinforcement with respect to an incorrect response. Stated differently, known prior art teaching devices make no provision for enabling a student to profit subliminally or otherwise from his mistakes. Thus, these prior art devices fall short of taking advantage of an important aspect of learning. A further shortcoming of such prior art devices, particularly test sheets, flash cards, and the like, is their inability to provide the student, after he has made an incorrect response, with an immediate opportunity to elicit another response, or a number of responses, if necessary, to enable him to experience a correct answer reinforcement with respect to any particular exercise or problem upon which he is, at the moment, concentrating. In other words, these prior art devices merely inform the student that he has made an incorrect response with respect to a particular problem. The student cannot, with such devices, immediately retest himself, while the problem is still fresh in his mind, and thereby be guided to the correct answer to the problem before he is required to make a response with respect to an entirely different problem. Thus, the benefits to be gained from a correct answer reinforcement experienced through immediate self-retesting by the student with respect to the particular problem on which he is concentrating are lost. Apart from these significant shortcomings, teaching devices of the type here under consideration are of relatively complex construction and, therefore, entail comparatively high costs both at the manufacturing level and the retail level. These factors, in many instances, place such devices beyond the reach of school district budgets and deprive a large number of students of the benefits to be derived from exposure to these valuable teaching aids.

In accordance with the present invention there is provided a teaching device which overcomes the aforementioned disadvantages of prior art teaching devices. The device of this invention includes a unique program format which can be adapted to a wide variety of subjects for all grade levels and which enables a student utilizing the device to experience reinforcement not only with respect to correct answers but also with respect to incorrect responses. In the event that the student's response elicits an incorrect answer, the device affords him an immediate opportunity to readily retest himself until he is guided by manipulation of the device to a correct answer reinforcement with respect to the particular exercise or problem upon which the student is concentrating. Thus, the device enables the student to obtain the fullest advantage, from a learning standpoint, not only of correct responses but also incorrect responses. The device is simple to operate and can be easily manipulated by a user. The increments of information comprising the program format of the device are arranged in a manner to promote optimum opportunity for full concentration by the student upon each increment as it is presented. The device is self-contained, light in weight, and can withstand rough handling. It can be manufactured from inexpensive materials at minimal cost. The individual components comprising the device are interlocked in a unique manner thereby eliminating the need for auxiliary fastening or connecting means. This unique interlocking feature of the components of the device facilitates and simplifies manufacture and packaging of the device, and enables the device to be easily and readily assembled at its point of use.

Briefly, the preferred embodiment of the teaching device of the present invention comprises a composite sheet assembly which desirably includes two rotatable discs. The discs are maintained in concentric, superimposed, rotatable relation with respect to one another by diametrically opposed, relatively large tongues or tabs struck from one of the discs. The tabs, when folded outwardly, are placed in register with a central opening in the other disc and are resiliently brought into overlying relation with respect to a substantial portion of one surface of the disc adjacent the central opening therethrough. The back or rear side or face of one of the two discs has a plurality of spaced, complete increments of information arranged on it. The other disc is provided with a peripheral window or opening of a size to enable each complete increment of information on the rear face of the said one disc to be separately and clearly viewed as either one of the discs is rotated with respect to the other disc. The front face of the said one disc is provided with the same increments of information as are provided on the rear face thereof only they are in incomplete form and are randomly arranged on the front face of the disc. The inner side or face of the other disc has correlatable increments of information randomly arranged in space relation thereon. Adjacent each of the incomplete increments of information on the front face of the said one disc is an opening to enable a student using the device to view the correlatable increments of information on the inner face of the said other disc. The correlatable increments of information on the inner face of the said other disc constitute a portion of the complete increments provided on the rear face of the said one disc and when, by rotation of either one of the discs relative to the other, any one of these increments is properly correlated with an incomplete increment on the front face of the said one disc, the student will experience a correct answer reinforcement which will appear on the rear face of the said one disc through the peripheral window or opening in the said other disc. The complete increments of information on the rear face of the said one disc and the correlatable increments of information on the inner face of the said other disc are scrambled to prevent the student from obtaining a correct answer reinforcement by associating the various increments of information with any particular arrangement of the increments on the discs. Also, and more importantly, the said incomplete and correlatable increments of information are arranged on the discs in a manner such that not more than one correct correlation of the incomplete increments is possible at any one setting of the discs. Thus, only one correct answer reinforcement will be experienced by the student when he has made a proper response.

As indicated hereinabove, the device of the present invention enables a student to benefit from an incorrect response or correlation of increments of information appearing on the respective faces of said discs. Thus, in those instances where the student does not correctly correlate the increments of information on the front face of the said one disc and the inner face of the said other disc, while the student's response will not receive a correct answer reinforcement on the rear side of the said one disc, he will be reinforced with respect to the complete, though incorrect, increment of information on the rear side visible through the peripheral window or opening in the said other disc. This reinforcement, whether subliminal or conscious, serves as a valuable refresher to the student with respect to that particular increment of information of the learning program format studied by the student prior to calling upon him to make a response. In addition, the foolproof self-checking feature of the device, together with the arrangement of the learning program format on the discs and the easy manipulability of the discs relative to one another, enables the student to immediately retest himself with respect to any problem in connection with which he has made an incorrect correlation and to be guided by the device in so doing to a correct answer reinforcement with respect to that problem at the time he is concentrating upon it.

The above and other objects, advantages and features of the invention will become apparent upon making reference to the specification to follow, the claims and the drawings wherein:

FIG. 1 is a perspective view of one side of an embodiment of the teaching device of the present invention;

FIG. 2 is a corresponding view of the opposite side of said embodiment with the components of the embodiment rotated to a different position;

FIG. 3 is a fragmentary perspective view of the side of the embodiment illustrated in FIG. 1 showing the relationship of the components on said side when the components are in the position shown in FIG. 2;

FIG. 4 is a vertical sectional view taken substantially along line 4—4 of FIG. 1;

FIG. 5 is a perspective view of one of the components of said embodiment;

FIG. 6 is a perspective view of the other component of said embodiment;

FIG. 7 is an exploded view of said embodiment with the connecting tabs of one component folded outwardly preparatory to insertion through the circular opening in the other component; and FIGS. 8 through 13 are fragmentary perspective views of each side of various embodiments of the invention showing various types of subject matter adaptable for use in connection with the device.

Referring, now, in greater detail to the drawings, the preferred embodiment of the invention illustrated comprises two rotatable discs 10 and 12. The disc 10, as shown, desirably is slightly smaller in diameter than the disc 12 for reasons that will become clear as the description proceeds. The discs may be fabricated of any suitable rigid or semi-rigid material such as, for example, paperboard, cardboard, plastic, lightweight metal, or the like. The discs are maintained in superimposed, concentric, rotatable relation with respect to one another without the need for auxiliary fastening means such as rivets, grommets, washers, or the like. This result is attained in accordance with the present invention by forming one of the discs with a pair of centrally located diametrically opposed tongues or tabs and the other disc with a substantially circular center opening. The tabs, when bent or folded out of the plane of the disc from which they are formed, as shown in FIG. 7, and inserted through the circular opening in the other disc, will resiliently overlie portions of the said other disc adjacent the circular opening therein. The tabs, in register with the circular opening, hold the discs in superimposed relation and enables each disc freely to be rotated relative to the other about an axis perpendicular to the plane of the discs. In the embodiment of the invention illustrated, the disc 10 is formed with integral tabs 14—14 which register with a central circular opening 16 through the disc 12. The discs 10 and 12 advantageously are provided with integral radial extensions 18 and 20, respectively, at the peripheral or outer margin thereof to facilitate manipulation of the discs.

As indicated hereinabove, the teaching device of the present invention is adaptable for use in connection with a wide variety of subject matter. In FIGS. 1 through 3, for example, its use as an aid in teaching upper and lower case forms of letters of the alphabet is illustrated. The letters, ranging from A through I, are arranged in spaced relation on the rear face 22 of the disc 12 with the upper case form of each letter being positioned above its lower case form. As can be clearly seen in FIG. 1, the rear face 22 of the disc 12 is divided into ten segments of equal size. Nine of the segments contain a letter grouping while the tenth segment is left blank. The front face 24 of the disc 12 is divided into a similar number of segments but only the upper case form of the letter groupings is positioned in nine of the ten segments and the letters are arranged thereon in scrambled order. The inner face 26 of the disc 10, in turn, also is divided into segments corresponding in number to the segments on the rear and front faces 22 and 24, respectively, of the disc 12. Positioned in nine of the ten segments of the inner face of the disc 10 is the lower case form of the letter groupings appearing on the rear face 22 of the disc 12. By thus leaving one of the segments blank on the front face 24 of the disc 12 and the inner face 26 of the disc 10 only a single correct grouping of letters can be attained by manipulation of the inner face 26 relative to the front face 24.

To enable a student to concentrate fully on each of the letter groups appearing on the rear face 22 of the disc 12 as they are sequentially presented to him, the disc 10 is provided with a peripheral cut-out or window 30. To enable the lower case form of the letters on the inner face 26 of the disc 10 to be seen by the student, as either one of the discs is rotated relative to the other, openings or holes 32 are provided in the front face 24 of the disc 12 below each of the upper case letters appearing thereon and opposite to the letters on the inner face 26 of the disc 10.

In utilizing the device illustrated in FIGS. 1 through 3, a student will sequentially position each letter grouping on the rear face 22 of the disc 12 opposite the peripheral cut-out or window 30 in the disc 10 and will focus his full attention on each grouping until he has assimilated the subject matter. When he has completed this process for each letter grouping, the student will turn the device over and, by rotation of either the disc 10 or the disc 12, will attempt to correctly match each of the upper case letters on the front face 24 of the disc 12 with the proper lower case letter on the inner face 26 of the disc 10. A correct response, that is, a correct matching of upper and lower case letters, as shown in FIG. 2 for the letter F, is reinforced by turning the device over and observing the complete upper and lower case grouping opposite the cut-out or window 30 of the disc 10 (see FIG. 3). As can be seen in FIG. 2, only one correct matching is possible and, correspondingly, only one correct answer reinforcement is possible upon turning the device over as shown in FIG. 3. In the event an incorrect response is made by the student such, for example, as matching the upper case letter E with the lower case form of the letter A, the student will not experience a correct answer reinforcement with respect to this response upon turning the device over. He will, however, subliminally or consciously, depending upon the degree of concentration manifested, experience reinforcement with respect to another complete letter grouping. This latter reinforcement will be in the nature of a relearning process and will act to strengthen the student's recognition of that particular letter grouping even though it is not the correct one. The student can, after making an incorrect response, immediately retest himself by again attempting to correlate the increments of information on the inner face 26 of the disc 10 with the increments on the front face 24 of the disc 12 until a correct answer reinforcement is observed on the rear face 22 of the disc 12 opposite the window 30 in the disc 10. Thus, as indicated hereinabove, the device will immediately guide the student to a correct correlation while his attention is concentrated on the particular problem with which he is dealing.

In connection with the foregoing description of the embodiment of the invention illustrated in FIGS. 1 through 3, it should be understood that the number of increments of information, in this case letter groupings, can be varied as desired. The only criteria required to be met in either reducing or increasing the number of increments are that the increments be arranged on the rear face 22 of the disc 12 and the inner face 26 of the disc 10 to prevent more than one correct response and, correlatively, to prevent the student from experiencing more than one correct answer reinforcement at any one setting of the discs. These criteria can be satisfied in such cases by dividing or segmenting the rear face 22 and the inner face 26 into a number of equal sized areas, greater by one, than the number of increments of information appearing thereon. Thus, there will be one blank or non-increment of information containing area on each of said faces.

The segments, or problem areas, on the rear face 22 of the disc 12, may be numbered or otherwise identified, for the convenience of the student and the instructor in locating quickly any particular increment of information appearing thereon. To this end, the diameter of the disc 10 advantageously is slightly smaller than that of the disc 12 thereby to expose a narrow circumferential edge portion 34 of the disc 12 for locating a number or other identifying indicia. A narrow circumferential edge portion of the front face 24 of the disc also may be provided with identifying indicia for each of the segments or problem areas thereon.

Referring now to FIGS. 8 through 13 of the drawings, the adaptability of the device of the present invention to various subject matter is illustrated. In FIGS. 8 and 9, a word-picture learning program format is employed with the device. As in the previously described embodiment of the invention, the rear face 22 of the disc 12 is divided into segments, or problem areas, and each of the segments, but one, is provided with a different complete word-picture grouping. The disc 10, also as before, is provided with a peripheral cut-out or window to enable a student to clearly focus his full attention on each grouping as it is presented to him by rotation of either one of the discs relative to the other. The front face 24 of the disc 12 has segments, or problem areas, each of which contains a portion only, i.e. the picture of the chair, of the corresponding complete word-picture grouping on the rear face 22. The incomplete increments of information on the front face advantageously are scrambled to prevent any possible association by the student with respect to the order of arrangement of the subject matter on the rear face 22, and, further, the incomplete increments of information on the faces 24 and 26 are scrambled with relation to one another to prevent a student from turning the discs through a recognizable pattern of correct correlations. The disc 10 has arranged on its inner face 26 correlating increments of information, i.e. the word "chair," comprising portions only of the corresponding complete word-picture grouping on the rear face 22 of the disc 12. The words are scrambled for the reasons already stated. Openings or holes are provided in the front face 24 of the disc 12, adjacent each picture thereon and opposite the words on the inner face 26 of the disc 10. The learning and self-testing process described above is employed by the student and is a valuable aid in teaching him to read.

In FIGS. 12 and 13, the adaptability of the teaching device to arithmetical relationships is shown. In the embodiment illustrated, problems of addition are employed. It should be understood, of course, that subtraction, multiplication, and division problems, for example, as well as other mathematical relationships, could be used instead. The complete or answered problems are arranged in segments, or problem areas, on the rear face 22 of the disc 12. Incomplete portions, i.e. the two numbers to be added, of the problems are randomly arranged in each of the segments, or problem areas, on the front face 24 of the disc 12. The answers to the problems in turn, are randomly arranged in spaced relation on the inner face 26 of the disc 10. The student, after studying each of the problems on the rear face 22 of the disc 12 through the window 30 of the disc 10, turns the device over and tests his retention of the problems he has studied by correlating the answers on the inner face 26 of the disc 10 with the problems on the front face 24 of the disc 12. Correct answer reinforcement is experienced by the student, in those instances where a proper correlation has been made by him, by turning the device over and viewing the complete or answered problem on the rear face 22. In those instances where he had made an incorrect correlation, upon turning the device over to check his answer, the student, while not experiencing a correct answer reinforcement, will view another complete or answered problem on the rear face 22 and will be reinforced with respect to it either subliminally or otherwise. Thus, the learning process is strengthened and augmented even though an incorrect response was made by the student. The student, as previously described, can immediately retest himself with respect to the problem on which an incorrect response was obtained by manipulating the discs until a correct correlation is made between the increments on the faces 24 and 26, and a correct answer reinforcement is experienced.

In FIGS. 10 and 11, the versatility of the device of the present invention is further illustrated. In the embodiment shown, the device comprises two discs 10' and 12' of essentially the same diameter. The discs are maintained in superimposed, concentric, rotatable relation with respect to one another by diametrically opposed tongues or tabs 14'—14', struck from the disc 10', which extend through a circular opening 16' through the disc 12' and overlie portions of the disc 12' adjacent the circular opening 16' therethrough. The rear face 22' of the disc 12' has word groupings radially arranged in spaced relation thereon. As shown, the words comprising each grouping are antonymous or oppositive with respect to each other. The disc 10' is provided with a peripheral cut-out or window 30' to enable each word grouping to be viewed separately as the discs are rotated. To further aid the student, the outer face of the disc 10' may be provided with indicia, for example, the letters A and B, to identify each circumferentially aligned row of the word groupings. The front face 24' of the disc 12' has one word only of each word grouping circumferentially arranged in spaced relation thereon. The words, however, are scrambled and, instead of being furthest removed from the outer margin of the disc 12', as they are on the rear face 22' thereof, they are reversed and positioned adjacent the outer margin of the disc. The row designation, i.e. the letter A, for these words is the same. The other portions of each of the word groupings are randomly arranged in spaced relation on the inner face 26' of the disc 10'. The front face 24' of the disc 12' is provided with a plurality of cut-outs or windows 40 to enable a student to correlate each of the words on the inner face 26' of the disc 10' with the words on the front face 24' of the disc 12'. The designation, i.e. the letter B, is provided on the front face 24' to indicate that the words on the inner face 26' of the disc 10' correspond to the circumferentially aligned words comprising the row designated by the letter B on the rear face 22' of the disc 12'. The learning and self-testing procedure outlined hereinabove with regard to the previously discussed embodiments of the invention is applicable to the device shown in FIGS. 10 and 11.

While the invention has been described with relation to the illustrated specific embodiments thereof, it should be understood, of course, that the invention is not to be limited thereto, since various modifications may be made, and it is contemplated, therefore, by the appended claims, to cover any such modifications as fall within the spirit and scope of this invention.

What is claimed is:

1. A teaching device comprising a composite sheet assembly including a first sheet and a second sheet, said sheets being movably joined in superimposed relation one to the other, the first sheet having arranged on one side thereof a plurality of spaced, complete increments of information to be learned by a user of the device, the other side of said first sheet having arranged in spaced relation thereon incomplete increments of information corresponding to a portion of each of the complete increments of information on said one side thereof, said second sheet having arranged on one side thereof spaced increments of information corresponding to another portion of each of the complete increments of information on said one side of the first sheet each of which when correctly correlated with an incomplete increment on said other side of the first sheet by movement of the sheets relative to one another will provide a particular complete increment of information corresponding to a like complete increment of information on said one side of the first sheet, the correlating increments of information on said one side of the second sheet being arranged thereon to prevent more than one correct correlation of the incomplete increments of information on said other side of the first sheet and the correlating increments on said one side of the second sheet whereby the user will experience only one correct answer reinforcement upon proper correlation of any one of said incomplete and correlating increments of information, and means for said other side of the first sheet to enable the correlating increments of information on said one side of the second sheet to be seen by a user of the device, said second sheet having means on the other side thereof for enabling the correct answer reinforcement increment of information on said one side of the first sheet to be readily discernible to the user as well as an incorrect complete increment of information in those instances where an incorrect correlation of an incomplete and a correlating increment of information is made thereby to provide subliminal or other reinforcement with respect to said incorrect complete increment of information.

2. A teaching device as claimed in claim 1 wherein the incomplete increments of information on said other side of the first sheet and the correlatable increments of information on said one side of the second sheet are randomly arranged thereon to prevent a student from obtaining a correct answer reinforcement by associating the various increments of information with any particular arrangement thereof on said sides of the sheets.

3. A teaching device as claimed in claim 1 wherein said one side of the first sheet and said one side of the second sheet are formed into areas of substantially the same width, each of said areas but one of said one side of the first sheet having positioned therein a complete increment of information, and each of said areas but one of said one side of the second sheet having positioned therein a portion only of the complete increments of information on said one side of the first sheet.

4. A teaching device as claimed in claim 1 wherein the composite sheet asembly comprises a pair of superimposed concentrically oriented rotatable discs.

5. A teaching device as claimed in claim 4 wherein one of the discs is formed with integral diametrically opposed fastening means which are in register with a substantially circular opening through the other disc, said fastening means being positioned in overlying relation with respect to said other disc and lying in the plane thereof.

6. A device as claimed in claim 4 wherein each of said discs is provided with an outwardly extending marginal tab for facilitating rotation of said discs relative to one another.

7. A device as claimed in claim 1 wherein the incomplete increments of information and the correlating increments of information are on the same side of the device, and the complete increments of information are on the opposite side thereof.

8. A device as claimed in claim 1 wherein the other side of said second sheet is provided with an opening therethrough of a size to enable each of the complete increments of information on said one side of the first sheet to be separately viewed by a user of the device.

9. A device as claimed in claim 1 wherein said other side of the first sheet is provided with a least one opening therethrough to enable a user of the device to view the correlating increments of information on said one side of the second sheet as the sheets are moved relative to one another.

10. A method of teaching comprising providing a composite sheet assembly having a first side and a second side and including a first sheet and a second sheet arranged in superimposed, movable relation to one another, arranging in spaced relation on the face of the first sheet comprising a portion of the first side of the sheet assembly a plurality of complete increments of information to be learned by a student, arranging in spaced relation on the face of the first sheet comprising a portion of the second side of the sheet assembly incomplete increments of information corresponding to a portion only of each of the complete increments of information on the first side of the sheet assembly, arranging in spaced relation on the face of the second sheet comprising a portion of the second side of the sheet assembly increments of information corresponding to another portion of each of the complete increments of information on the first side of the sheet assembly, each of the incomplete increments of information on the faces of the first and second sheets comprising the second side of the sheet assembly when correctly correlated providing a complete increment of information on the second side of the sheet assembly which corresponds to the same complete increment of information on the first side of the sheet assembly, said incomplete increments of information on the second side of the sheet assembly being arranged thereon to prevent more than one correct correlation of the incomplete increments of information whereby a student will experience only one correct answer reinforcement on the first side of the sheet assembly, directing a student to sequentially present the complete increments of information on the first side of the sheet assembly to himself by moving the first and second sheets relative to one another until he has committed all of the complete increments of information thereon to memory, thereafter directing the student to test his retention of the complete increments of information on the first side of the sheet assembly by correlating each of the incomplete increments of information on the second side of the sheet assembly, directing the student after each correlation of the incomplete increments of information to refer to the first side of the sheet assembly to determine whether a correct correlation has been made, and in those instances where an incorrect correlation has been made permitting the student to again refer to the second side of the sheet assembly and to continue retesting himself until a correct correlation of incomplete increments of information of the second side of the sheet assembly has been manifested by a correct answer reinforcement on the first side of the sheet assembly.

11. A method as claimed in claim 10 including the step of arranging the incomplete increments of information on the second side of the sheet assembly in a different order than the complete increments of information are arranged on the first side of the assembly to prevent the student from associating the arrangement of the complete increments of information on the first side with the arrangement of the incomplete increments of information on the second side of the sheet assembly.

References Cited
UNITED STATES PATENTS

| | | | |
|---|---|---|---|
| 816,204 | 3/1906 | Zahn | 35—74 |
| 1,816,760 | 7/1931 | Barnowitz | 35—74 |
| 2,317,047 | 4/1943 | Foote | 35—74 |
| 2,797,499 | 7/1957 | Lagerdahl | 35—9.1 |
| 2,965,980 | 12/1960 | Day | 35—31.1 |

EUGENE R. CAPOZIO, Primary Examiner

WALTER W. NIELSEN, Assistant Examiner

U.S. Cl. X.R.

35—74